(12) United States Patent
Hwang et al.

(10) Patent No.: US 12,146,070 B2
(45) Date of Patent: Nov. 19, 2024

(54) ECO-FRIENDLY HYDROPHOBIC OR ULTRAHYDROPHOBIC COATING METHOD

(71) Applicant: POSTECH Research and Business Development Foundation, Pohang-si (KR)

(72) Inventors: Woonbong Hwang, Seoul (KR); Seongmin Kim, Cheonan-si (KR); Jeong-Won Lee, Gwangju (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 0 days.

(21) Appl. No.: 17/775,379

(22) PCT Filed: Jan. 29, 2021

(86) PCT No.: PCT/KR2021/001257
§ 371 (c)(1),
(2) Date: May 9, 2022

(87) PCT Pub. No.: WO2021/241843
PCT Pub. Date: Dec. 2, 2021

(65) Prior Publication Data
US 2023/0081036 A1 Mar. 16, 2023

(30) Foreign Application Priority Data
May 27, 2020 (KR) .................. 10-2020-0063861

(51) Int. Cl.
*C09D 183/04* (2006.01)
*B05D 3/02* (2006.01)
(Continued)

(52) U.S. Cl.
CPC ......... *C09D 183/04* (2013.01); *B05D 3/0254* (2013.01); *B05D 3/102* (2013.01);
(Continued)

(58) Field of Classification Search
CPC .......... C09D 183/04; C09D 7/61; C09D 5/00; B05D 3/0254; B05D 3/102; B05D 5/08;
(Continued)

(56) References Cited

U.S. PATENT DOCUMENTS 8,586,693 B2 11/2013 Zimmermann et al.
8,614,003 B2 12/2013 Ma et al.
(Continued)

FOREIGN PATENT DOCUMENTS

CN 105646884 6/2016
EP 2951252 12/2015
(Continued)

OTHER PUBLICATIONS

Li et al. "Drag-reductive and anti-corrosive superhydrophobic surface fabricated on aluminum with thin PDMS/SiO2 coating" Mater. Res. Express 6 (2019) 1065a8.*
(Continued)

*Primary Examiner* — Robert S Walters, Jr.
(74) *Attorney, Agent, or Firm* — LEX IP MEISTER, PLLC

(57) ABSTRACT

The present invention relates to an eco-friendly and simple super-hydrophobic coating method that does not use harmful substances and special equipment. Coating according to the present invention may be performed as a single process without special equipment, and because only eco-friendly materials are used, the coating material may be easily used and discarded. In addition, even a three-dimensional pipe or a heat-exchanger having a complex shape may be modified to have super-hydrophobicity by applying the present coating, and a super-hydrophobic metal filter may be manufactured and used for oil-water separation. As a result, the present coating method is eco-friendly, simple, and appli-
(Continued)

cable to various substrates, so it has great potential for application in various industries.

15 Claims, 15 Drawing Sheets

(51) Int. Cl.
| | |
|---|---|
| B05D 3/10 | (2006.01) |
| B05D 5/08 | (2006.01) |
| B05D 7/16 | (2006.01) |
| C08G 77/04 | (2006.01) |
| C08K 3/28 | (2006.01) |
| C09D 5/00 | (2006.01) |
| C09D 7/61 | (2018.01) |
| C23F 1/34 | (2006.01) |
| C23F 1/36 | (2006.01) |

(52) U.S. Cl.
CPC ............... *B05D 5/08* (2013.01); *B05D 7/16* (2013.01); *C08G 77/04* (2013.01); *C08K 3/28* (2013.01); *C09D 5/00* (2013.01); *C09D 7/61* (2018.01); *C23F 1/34* (2013.01); *C23F 1/36* (2013.01)

(58) Field of Classification Search
CPC .. B05D 7/16; C08G 77/04; C08K 3/28; C23F 1/34; C23F 1/36
See application file for complete search history.

(56) References Cited

U.S. PATENT DOCUMENTS

| | | | |
|---|---|---|---|
| 9,675,994 | B2 | 6/2017 | Schoenfisch et al. |
| 11,168,276 | B2 | 11/2021 | Larimer et al. |
| 11,247,230 | B2 | 2/2022 | Constantinou et al. |
| 2007/0009657 | A1 | 1/2007 | Zhang et al. |
| 2011/0229667 | A1 | 9/2011 | Jin et al. |
| 2017/0029592 | A1* | 2/2017 | Shepherd ............... C08J 9/365 |
| 2020/0198291 | A1 | 6/2020 | Jin et al. |

FOREIGN PATENT DOCUMENTS

| | | |
|---|---|---|
| KR | 10-2008-0004410 | 1/2008 |
| KR | 10-2010-0012050 | 2/2010 |
| KR | 10-2010-0101977 | 9/2010 |
| KR | 10-1468334 | 12/2014 |
| KR | 10-2015-0001082 | 1/2015 |
| KR | 10-1606642 | 3/2016 |
| KR | 10-2017-0050320 | 5/2017 |
| KR | 10-1737757 | 5/2017 |
| KR | 10-2017-0130704 | 11/2017 |
| KR | 10-1983974 | 9/2019 |

OTHER PUBLICATIONS

Lebo Xu et al., "Transparent, Superhydrophobic Surfaces from One-Step Spin Coating of Hydrophobic Nanoparticles", ACS Appl. Mater. Interfaces 2012, 4, 1118-1125, Jan. 31, 2012.

Ignasi Vilaró et al., "Superhydrophobic Copper Surfaces with Anticorrosion Properties Fabricated by Solventless CVD Methods", ACS Appl. Mater. Interfaces 2017, 9, 1057-1065, Dec. 15, 2016.

Seongmin Kim et al., "One-Step Eco-Friendly Superhydrophobic Coating Method Using Polydimethylsiloxane and Ammonium Bicarbonate", ACS Appl. Mater. Interfaces 2020, 12, 28869-28875, May 28, 2020.

Mengchun Wu et al., "Applied Voltage and Near-Infrared Light Enable Healing of Superhydrophobicity Loss Caused by Severe Scratches in Conductive Superhydrophobic Films", Adv.Funct. Mater. 2016, 26, 6777-6784, Jul. 2016.

Dongwhi Choi et al., "Facile and cost-effective fabrication of patternable superhydrophobic surfaces via salt dissolution assisted etching", Applied Surface Science 393 (2017) 449-456, Oct. 2016.

Jeong-Won Lee et al., "Fabrication of a superhydrophobic surface with fungus-cleaning properties on brazed aluminum for industrial application in heat exchangers", Applied Surface Science 442 (2018) 461-466, Feb. 2018.

Jiao Xie et al., "Robust and anti-corrosive PDMS/SiO2 superhydrophobic coatings fabricated on magnesium alloys with different-sized SiO2 nanoparticles", Applied Surface Science 457 (2018) 870-880, Jun. 2018.

Seongmin Kim et al., "Repeatable replication method with liquid infiltration to fabricate robust, flexible, and transparent, anti-reflective superhydrophobic polymer films on a large scale", Chemical Engineering Journal 350 (2018) 225-232, May 2018.

Seongmin Kim et al., "Simple fabrication method of flexible and translucent high-aspect ratio superhydrophobic polymer tube using a repeatable replication and nondestructive detachment process", Chemical Engineering Journal 361 (2019) 975-981, Dec. 2018.

Shan Peng et al., "Photocatalytically Stable Superhydrophobic and Translucent Coatings Generated from PDMS-Grafted-SiO2/TiO2@PDMS with Multiple Applications", Langmuir 2019, 35, 2760-2771, Jan. 24, 2019.

Huaiyuan Wang et al., "A superrobust superhydrophobic PSU composite coating with self-cleaning properties, wear resistance and corrosion resistance", RSC Adv., 2016, 6, 10930, Jan. 2016.

Shanlin Wang et al., "Large-scale fabrication of translucent, stretchable and durable superhydrophobic composite films", J. Mater. Chem. A, 2017, 5, 23489, Oct. 2017.

Wing Yi Pao, "Design and Development of Hydrophobic and Protective Polymer-based Spray Coatings for Treating Glass Surfaces in Building and Automotive Applications":Ontario Tech University, Aug. 2019.

Zhuyang Chen, "Robust superhydrophobic nanocomposite coatings" : UCL Engineering, Jan. 2019.

KIPO, PCT Search Report & Written Opinion of Application No. PCT/KR2021/001257, dated Sep. 1, 2021.

* cited by examiner

US 12,146,070 B2

ECO-FRIENDLY HYDROPHOBIC OR ULTRAHYDROPHOBIC COATING METHOD

TECHNICAL FIELD

The present invention relates to a hydrophobic or super-hydrophobic coating method. Specifically, present invention relates to a method of coating a surface of a substrate using only an eco-friendly material to modify the surface to have hydrophobicity or super-hydrophobicity.

BACKGROUND ART

A solid has an intrinsic surface energy, and when solid comes into contact with a certain liquid, the liquid either wets or does not wet a surface of the solid due to surface energy of the solid and the liquid. When a contact angle between the surface and water is 90° or greater, the surface is called a hydrophobic surface, and when a contact angle with water is 150° or greater and a contact angle hysteresis, which is a difference between advancing and receding angles, is less than 10°, and when the surface is not wetted by water, the surface is called a super-hydrophobic surface. Such a super-hydrophobic surface has properties such as self-cleaning, pollution prevention, and drag reduction, and is attracting attention in various industrial fields. Therefore, many studies have been conducted to realize a super-hydrophobic surface. The super-hydrophobic surface forms a micro/nano-scale microstructure (surface roughness) on the surface, and may be realized when the surface energy is very low.

Super-hydrophobic coating methods for lowering the surface energy include a spray coating method, a spin coating method, and the like. Existing coating methods may be used to realize a super-hydrophobic surface by lowering the surface energy, but these methods have disadvantages in that a process is complicated and special equipment is required. Accordingly, a dip coating method that is simple and may be applied to a two-dimensional (2D) shape is widely used. However, since a coating material for dip coating contains harmful solvents such as hexane, acetone, toluene, etc. for diluting a coating solution, the coating material may have a negative effect on the environment and humans, and thus it is accompanied by great inconvenience in use and additional costs are incurred for waste liquid disposal. In addition, since a specimen is in direct contact with the coating solution during a dipping process, the specimen may be swollen or corroded by the solvent of the coating solution.

Meanwhile, polydimethylsiloxane (PDMS) is an eco-friendly silicone-based material and has very low surface tension, so it may be used as a super-hydrophobic coating material. However, for coating using PDMS, a high-temperature environment of 220° C. or higher is required, so workability is very poor, complex processes such as spin coating and special equipment are required for room-temperature coating, and a process of diluting a harmful material such as hexane or acetone is required for dip coating, which is, thus, harmful to the environment and humans. Therefore, there is a need to develop a super-hydrophobic coating method that may lower the surface energy through a simple process without using harmful substances.

The above information disclosed in this Background section is only for enhancement of understanding of the background of the invention, and therefore it may contain information that does not form the prior art that is already known in this country to a person of ordinary skill in the art.

DISCLOSURE

Technical Problem

The present invention has been made in an effort to realize a super-hydrophobic surface by modifying substrate surface energy using an additive in polydimethylsiloxane (PDMS), which is harmless to the environment and the human body.

Technical Solution

An exemplary embodiment of the present invention provides a surface modification method including: preparing a metal substrate on which surface roughness is formed; preparing a coating solution in which a polydimethylsiloxane (PDMS) agent and ammonium bicarbonate are mixed; and coating the surface of the metal substrate with PDMS by increasing a temperature of the coating solution.

The coating of the surface of the substrate with PDMS by increasing the temperature of the coating solution may include: increasing the temperature after the substrate and the coating solution are loaded in an airtight container.

In the coating of the surface of the substrate with PDMS by increasing the temperature of the coating solution, the increased temperature may be 70 to 120° C.

The coating of the surface of the substrate with PDMS by increasing the temperature of the coating solution may be performed for more than 15 minutes to less than 90 minutes, so that the surface of the substrate may be modified to have a hydrophobic surface having a contact angle of 90° or greater and a contact angle hysteresis of 10° or greater.

The coating the surface of the substrate with PDMS by increasing the temperature of the coating solution may be performed for 90 minutes or more, so that the surface of the substrate may be modified to have a super-hydrophobic surface having a contact angle of 150° or greater and a contact angle hysteresis less than 10°.

The surface modification method may use a coating solution in which a PDMS agent and ammonium bicarbonate are mixed in a weight ratio of less than 1:2, so that the surface of the substrate may be modified to have a contact angle of 90° or greater and a contact angle hysteresis of 10° or greater.

The surface modification method may use a coating solution in which a PDMS agent and ammonium bicarbonate are mixed in a weight ratio of 1:2 or greater, so that the surface of the substrate may be modified to have a contact angle of 150° or greater and a contact angle hysteresis less than 10°. The metal substrate on which surface roughness is formed may be aluminum, copper, or a combination thereof.

The metal substrate on which surface roughness is formed may be a metal mesh or a three-dimensional (3D) object.

The substrate on which surface roughness is formed may have a micro-scale microstructure or a nano-scale microstructure formed on the surface.

The preparing of a metal substrate on which surface roughness is formed may include: forming a micro-scale microstructure by dipping the metal substrate in an acid solution having a concentration of 1 to 5M at room temperature for 5 to 15 minutes.

The preparing of a metal substrate on which surface roughness is formed may include forming a nano-scale microstructure by dipping the metal substrate in a basic solution having a concentration of 0.5 to 3M at room temperature for 1 to 10 seconds and then dipping the metal substrate in water at a temperature of 80 to 100° C. for 1 to 10 minutes.

The surface modification method may further include: heating and drying the substrate on which the microstructure is formed, after the forming of the micro- or nano-scale microstructure.

The coating the surface of the substrate with PDMS by increasing the temperature of the coating solution may include modifying the surface by decomposing and vaporizing the ammonium bicarbonate and reacting PDMS molecules with a functional group on the surface of the substrate.

The PDMS agent may have a ratio of the main agent and the curing agent of 20:1 to 1:1.

Advantageous Effect

According to an exemplary embodiment of the present invention, the process may be performed as a single process without using special equipment.

According to an exemplary embodiment of the present invention, the coating material may be easily used and discarded by using only materials that are harmless to the environment and humans According to an exemplary embodiment of the present invention, robustness of a coating layer may be ensured, and it may be applied to a substrate having a 3D shape or a complex shape.

According to an exemplary embodiment of the present invention, a super-hydrophobic filter may be manufactured by applying the coating method of the present invention to a metal mesh, and oil and water may be separated with high efficiency using the manufactured filter.

According to an exemplary embodiment of the present invention, since a super-hydrophobic copper surface is implemented by applying the coating method to a copper surface, the coating method may be applied to various types of substrates.

According to an exemplary embodiment of the present invention, unlike dip coating in which a substrate may be swollen or corroded by a solvent of the coating solution, in the coating of the present invention, the coating material and the substrate are not in direct contact with each other, so damage or deformation of the surface of the substrate due to the coating material may be prevented.

Since the super-hydrophobic coating method of an exemplary embodiment of the present invention is simple and completely harmless to the environment and humans, it is expected to be usefully applied in the super-hydrophobic surface production industry that has recently been attracting attention.

MODE FOR INVENTION

Figure 1:
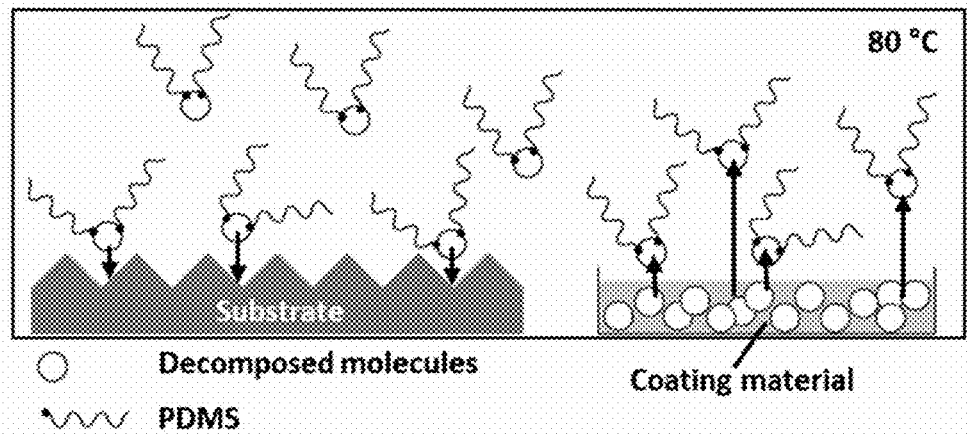
FIG. 1 illustrates a process in which a polydimethylsiloxane (PDMS) coating layer is formed on a surface of a substrate using multi-wet coating of an exemplary embodiment of the present invention.

Although terms such as first, second, and third are used for describing various parts, various components, various areas, various layers and/or various sections, the present invention is not limited thereto. Such terms are used only to distinguish any part, any component, any area, any layer, or any section from the other parts, the other components, the other areas, the other layers, or the other sections. Thus, a first part, a first component, a first area, a first layer, or a first section which is described below may be mentioned as a second part, a second component, a second area, a second layer, or a second section without departing from the scope of the present invention.

Here, terminologies used herein are merely used to describe a specific exemplary embodiment, and are not intended to limit the present invention. A singular form used herein includes a plural form as long as phrases do not express a clearly opposite meaning. The term "include" used in the specification specifies specific characteristics, a specific area, a specific essence, a specific step, a specific operation, a specific element, and/or a specific ingredient, and does not exclude existence or addition of the other characteristics, the other area, the other essence, the other step, the other operation, the other element, and/or the other ingredient.

When it is mentioned that a first component is located "above" or "on" a second component, the first component may be located directly "above" or "on", or the second component or a third component may be interposed therebetween. In contrast, when it is mentioned that a first component is located "directly above" a second component, a third component is not interposed therebetween.

In addition, unless otherwise specified, % means wt % and 1 ppm is 0.0001 wt %.

Although not otherwise defined, all terms used herein, including technical terms and scientific terms, have the same meanings as those generally understood by those skilled in the art to which the present invention pertains. Terms defined in a generally used dictionary are interpreted as meanings according with related technical documents and currently disclosed contents, and are not interpreted as ideal meanings or very formal meanings unless otherwise defined.

Hereinafter, an exemplary embodiment of the present invention will be described in detail so that a person skilled in the art to which the present invention pertains may easily implement it. As those skilled in the art would realize, the described exemplary embodiments may be modified in various different ways, all without departing from the spirit or scope of the present invention.

A surface modification method of an exemplary embodiment of the present invention relates to a method of implementing a hydrophobic or super-hydrophobic surface by performing PDMS coating on a surface of a substrate on which a micro/nano structure is formed to lower surface energy.

Hereinafter, each step will be described in detail.

A surface modification method of an exemplary embodiment of the present invention includes preparing a metal substrate on which surface roughness is formed; preparing a coating solution in which a polydimethylsiloxane (PDMS) agent and ammonium bicarbonate are mixed; and coating the surface of the metal substrate with PDMS by increasing a temperature of the coating solution.

The coating of the surface of the substrate with PDMS by increasing the temperature of the coating solution may include: increasing the temperature after the substrate and the coating solution are loaded in an airtight container.

In the coating of the surface of the substrate with PDMS by increasing the temperature of the coating solution, the increased temperature may be 70 to 120° C. Specifically, the temperature may be 70 to 100° C., or more specifically 75 to 85° C. Most preferably, the temperature may be 80° C.

If the increased temperature of the coating solution is too low, ammonium bicarbonate may not be thermally decomposed, so PDMS deposition may not be smooth, and if the increased temperature is too high, it may be difficult to carry out the deposition or the economical efficiency may be lowered.

The coating of the surface of the substrate with PDMS by increasing the temperature of the coating solution may be performed for more than 15 minutes to less than 90 minutes, so that the surface of the substrate may be modified to have a hydrophobic surface having a contact angle of 90° or greater and a contact angle hysteresis of 10° or greater.

The coating the surface of the substrate with PDMS by increasing the temperature of the coating solution may be performed for 90 minutes or more, so that the surface of the substrate may be modified to have a super-hydrophobic surface having a contact angle of 150° or greater and a contact angle hysteresis less than 10°.

That is, the degree of hydrophobicity of the surface of the substrate may be controlled according to a coating time by increasing the temperature of the coating solution.

The surface modifying method may use a coating solution in which a PDMS agent and ammonium bicarbonate are mixed in a weight ratio of less than 1:2, so that the surface of the substrate may be modified to have a contact angle of 90° or greater and a contact angle hysteresis of 10° or greater.

The surface modifying method may use a coating solution in which a PDMS agent and ammonium bicarbonate are mixed in a weight ratio of 1:2 or greater, so that the surface of the substrate may be modified to have a contact angle of 150° or greater and a contact angle hysteresis less than 10°.

If the weight ratio of the PDMS agent and ammonium bicarbonate does not satisfy the corresponding range, the PDMS deposition may not be smooth, and the properties of the substrate surface may be controlled to be hydrophobic and super-hydrophobic by controlling the weight ratio of the PDMS agent and ammonium bicarbonate.

The metal substrate on which surface roughness is formed may be aluminum, copper, or a combination thereof.

The metal substrate on which surface roughness is formed may be a metal mesh or a three-dimensional (3D) object. Specifically, the 3D object may be a pipe, a heat exchanger having a complex shape, or the like.

The substrate on which surface roughness is formed may have a micro-scale microstructure or a nano-scale microstructure formed on the surface.

The preparing of a metal substrate on which surface roughness is formed may include: forming a nano-scale microstructure by dipping the metal substrate in an acid solution having a concentration of 1 to 5M at room temperature for 5 to 15 minutes. Specifically, the acid may be hydrochloric acid. Specifically, the acid concentration may be 1 to 3M. The acid treatment time may be 8 to 12 minutes.

The preparing of a metal substrate on which surface roughness is formed may include forming a micro-scale microstructure by dipping the metal substrate in a basic solution having a concentration of 0.5 to 3M at room temperature for 1 to 10 seconds and then dipping the metal substrate in water at a temperature of 80 to 100° C. for 1 to 10 minutes. Specifically, the basic solution may be a sodium hydroxide solution The concentration of the basic solution may be 1 to 2M. A time for treating the basic solution may be 3 to 7 seconds. A temperature of water may be 90 to 100° C. A time for treating water may be 3 to 7 minutes.

If the concentration of the acid or base and the dipping time are not controlled within the corresponding ranges in the step for forming the surface roughness, the microstructure may not be well formed or may be formed too excessive to be controlled to a desired degree.

In order to form the surface roughness, the method may include heating and drying the substrate in an oven, after the acid treatment or base treatment of the metal substrate. The heating and drying are a step of heating the substrate in an oven at 80° C. for 1 hour and then drying the substrate.

The coating of the surface of the substrate with PDMS by increasing the temperature of the coating solution may include modifying the surface by decomposing and vaporizing the ammonium bicarbonate and reacting PDMS molecules with a functional group on the surface of the substrate.

The PDMS agent may have a ratio of the main agent and the curing agent of 20:1 to 1:1. Specifically, the ratio of the main agent to the curing agent may be 15:1 to 1:1. More specifically, the ratio may be 10:1 to 5:1. Preferably, the ratio of the main agent and curing agent of the PDMS agent may be 10:1.

Hereinafter, exemplary embodiments of the present invention will be described in detail so that those skilled in the art to which the present invention pertains may easily implement them. However, the present invention may be embodied in various different forms and is not limited to the exemplary embodiments described herein.

(Formation of Surface Roughness on the Substrate)

In order to obtain an aluminum substrate having a micro-structured surface roughness, the aluminum substrate was dipped in a 2M hydrochloric acid solution at room temperature for 10 minutes.

In order to obtain an aluminum substrate with nano-structured surface roughness, the aluminum substrate was dipped in a 1M sodium hydroxide solution at room temperature for 5 seconds, followed by dipped in 95° C. water for 5 minutes.

An aluminum substrate having a micro or nano structure formed on a surface thereof was dried in an oven at 80° C. for 1 hour.

(Experiment of Forming PDMS Coating)

As a coating solution, a mixture of PDMS and ammonium bicarbonate in a 1:2 ratio was prepared. That is, the coating solution was prepared by mixing 11 g of PDMS and 22 g of ammonium bicarbonate (main agent: curing agent=10:1 weight ratio).

The prepared coating solution and the substrate having the micro/nano-structured surface roughness were loaded together in an airtight container and maintained at 80° C. for 90 minutes to coat the substrate surface with PDMS.

When the temperature inside the airtight container in which the substrate and the coating solution are loaded is increased to 80° C., the ammonium bicarbonate in the coating solution is decomposed into water, carbon dioxide, and ammonia molecules by heat as expressed in Formula (1) below.

$$NH_5CO_3 \rightarrow H_2O + CO_2 + NH_3— \qquad \text{Formula (1)}$$

As expressed in Formula (1), the decomposed molecules act as transmitters that help movement of PDMS molecules and float together with the PDMS molecules in the airtight container, and the PDMS molecules may react with functional groups such as a hydroxyl group (—OH) to form a robust hydrophobic layer.

FIG. 1 illustrates a process of forming a hydrophobic coating layer by binding the PDMS molecules floating on the surface of the substrate by a multi-wet coating method of the present exemplary embodiment.

Figure 2:
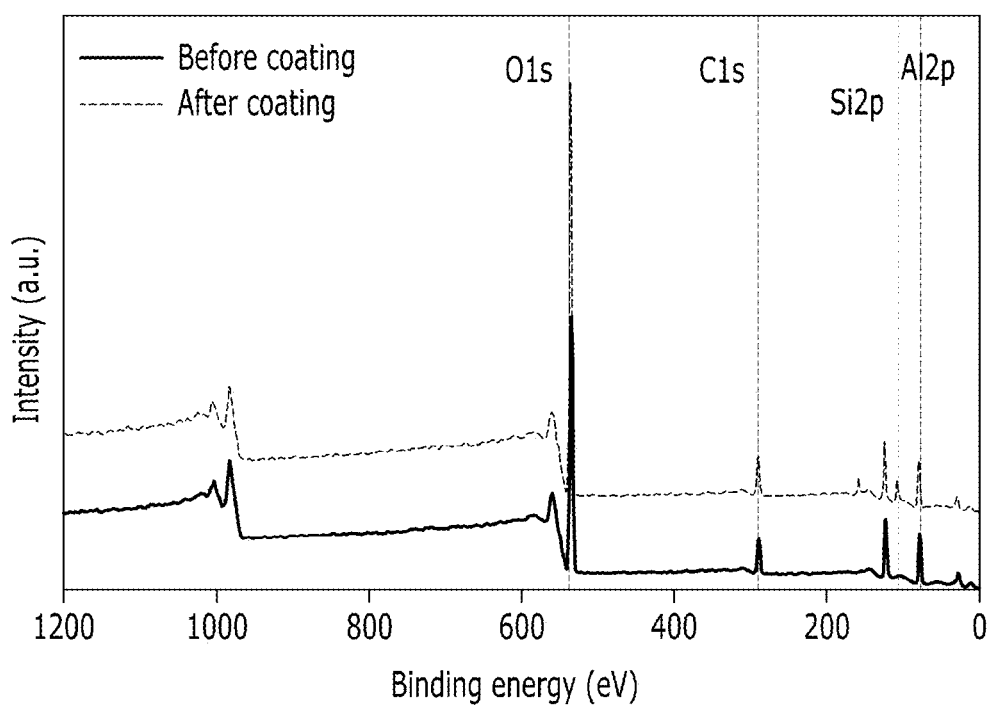
FIG. 2 is a graph illustrating an analysis of components of a surface of a substrate before and after coating of an exemplary embodiment of the present invention by X-ray photoelectron spectroscopy.

Components of the substrate surface before and after coating were measured using X-ray photoelectron spectroscopy. A 102.5 eV peak indicating Si was observed on the surface of the coated substrate, confirming that the PDMS coating layer was formed on the surface of the substrate (refer to FIG. 2).

Figure 3:
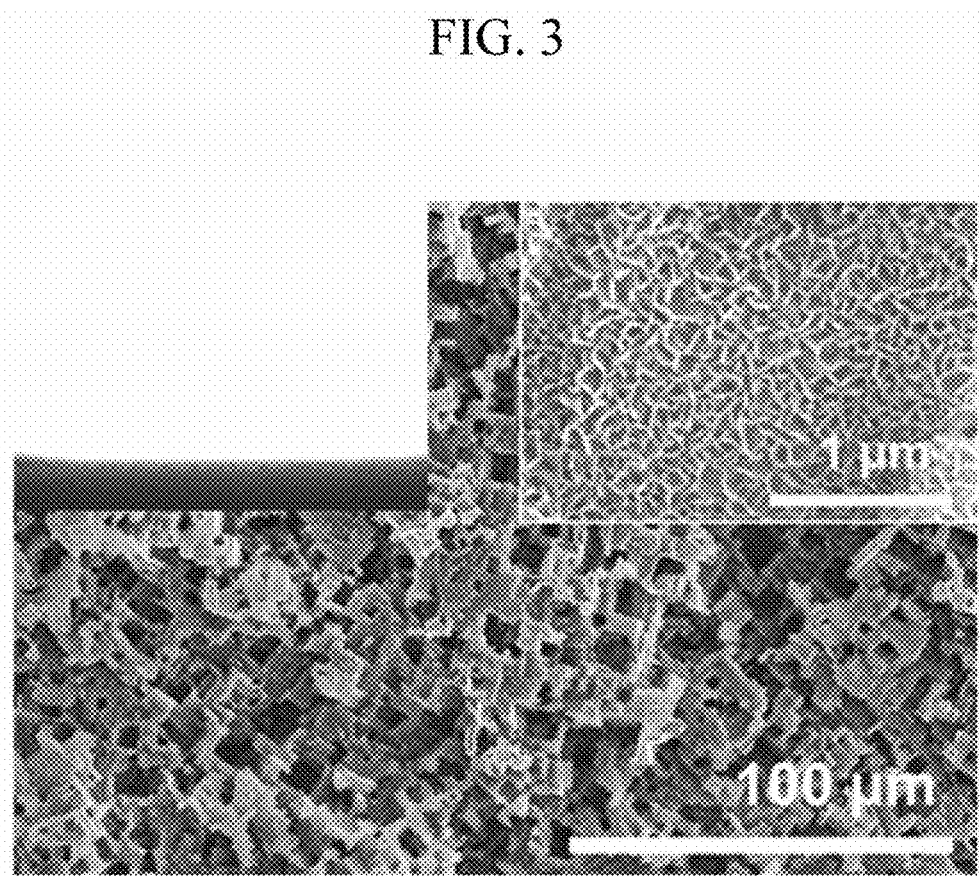
FIGS. 3 and 4 are photographs observed using a scanning electron microscope before (FIG. 3) and after (FIG. 4) coating of an exemplary embodiment of the present invention.
Figure 4:
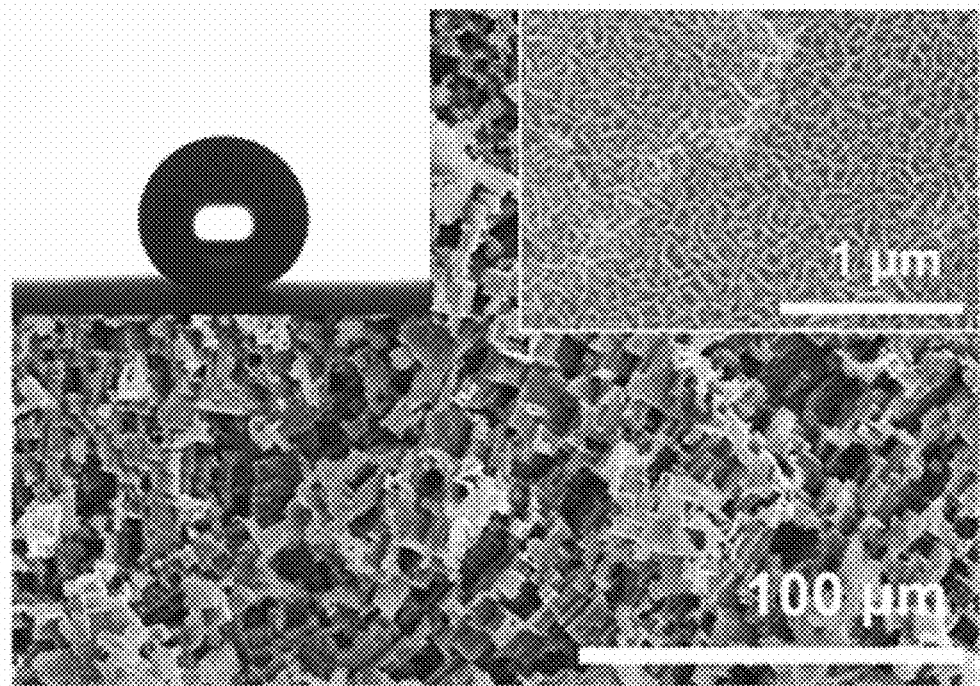

The surface structure before and after coating was observed using a scanning electron microscope. As the PDMS coating was coated, while maintaining the roughness structure of the substrate surface, it was confirmed that the surface roughness was maintained. Therefore, it was found that the surface roughness was maintained, and the surface energy was changed due to the formation of the hydrophobic and super-hydrophobic coating layer, so that hydrophobic and super-hydrophobic surfaces can be realized (refer to FIGS. 3 and 4).

Figure 5:
FIG. 5 illustrates a photograph of a silicone elastomer in the form of a sponge remaining after a coating process of an exemplary embodiment of the present invention.

The coated material after the coating process was checked. During the curing of the PDMS, ammonium bicarbonate was decomposed to form pores in the PDMS, and a sponge-type silicone elastomer was formed. Since both ammonium bicarbonate and silicone-based PDMS, which are also used as food additives, are eco-friendly materials, harmful substances are not formed in the coating process, and after the use of the coating material, only the silicone elastomer remains, and thus, no special treatment is required for disposal, and a disposal process is simple without incurring cost (refer to FIG. 5).

(Experiment of Comparing Contact Angles with Different Coating Times)

Only a coating time was changed by increasing the temperature of the container in which the substrate and the coating solution were loaded, and the mixing ratio and coating temperature of the coating solution were the same as in the PDMS coating formation experiment.

When the coating was carried out for 15 minutes, the PDMS was not sufficiently coated on the substrate surface, so that a contact angle was 0° and the hydrophobic surface was not formed.

When the coating was carried out for 60 minutes, the contact angle was increased to 162.5°, but the contact angle hysteresis was 11.6°, forming a hydrophobic coating rather than a super-hydrophobic coating.

Figure 6:
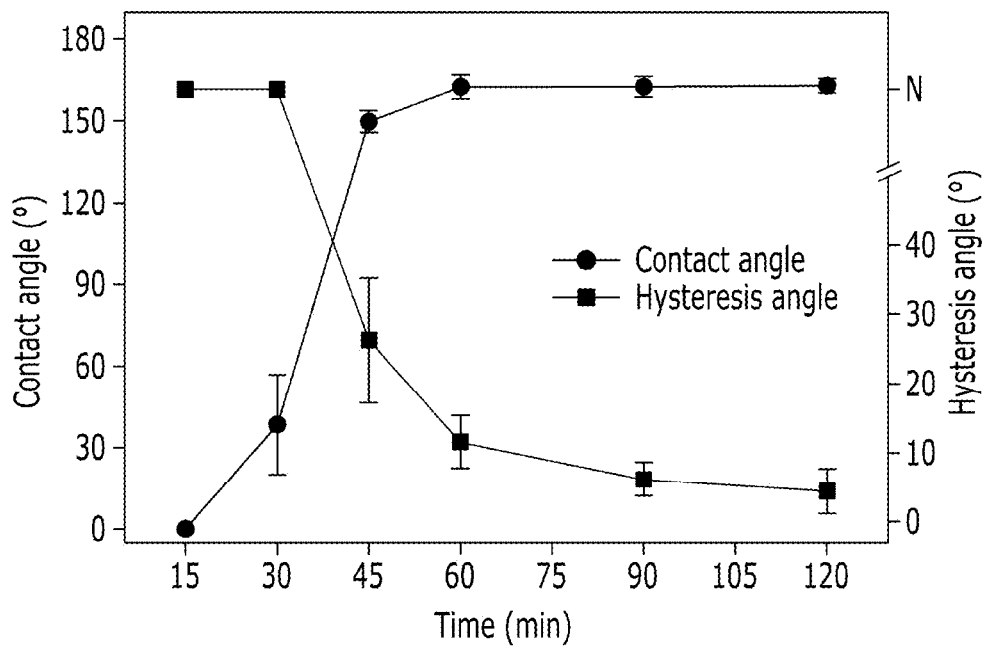
FIG. 6 is a graph illustrating a contact angle and contact angle hysteresis according to a coating time of an exemplary embodiment of the present invention.
Figure 7:
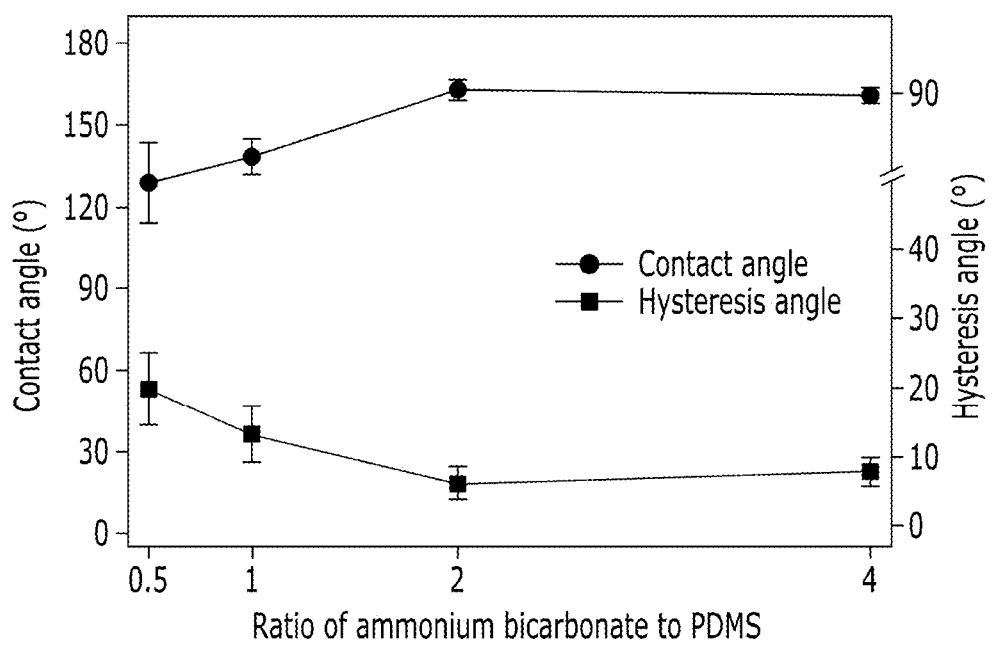
FIG. 7 is a graph illustrating a contact angle and a contact angle hysteresis according to a ratio of a coating material according to an exemplary embodiment of the present invention.

When the coating was carried out for 90 minutes, it was confirmed that the contact angle was 150° or greater, the contact angle hysteresis was less than 10°, and a super-hydrophobic coating was formed (refer to FIG. 6).

That is, it was confirmed that, as the coating time increased, the PDMS was cured on the surface of the substrate to form a hydrophobic coating layer, so that the contact angle gradually increased and the contact angle hysteresis gradually decreased.

As a result, the surface coated with the PDMS may be a super-hydrophobic surface with a contact angle of 150° or greater and a contact angle hysteresis less than 10° due to the PDMS layer having a very low surface energy along with surface roughness.

(Experiment of Comparing Coating Solution Mixing Ratio)

Except for changing the mixing ratio of the PDMS agent and ammonium bicarbonate in the coating solution as shown in Table 2 below, the same procedure as in the PDMS coating formation experiment was carried out. (Coating temperature 80° C., coating time 90 minutes)

TABLE 1

| PDMS agent:ammonium bicarbonate (weight ratio) | contact angle (°) | contact angle hysteresis (°) | surface characteristic |
|---|---|---|---|
| 2:1 | 128.7 | 19.8 | hydrophobic |
| 1:1 | 138.0 | 13.3 | hydrophobic |
| 1:2 | 162.6 | 6.2 | super-hydrophobic |
| 1:4 | 160.5 | 7.9 | super-hydrophobic |

As a result of the coating, it can be seen that, when the weight ratio of the PDMS agent and ammonium bicarbonate was 2:1 to 1:1, the surface was modified to a hydrophobic surface having a contact angle hysteresis of 10° or greater and a contact angle of 90° or greater and less than 150°, and when the weight ratio of the PDMS agent and ammonium bicarbonate was 1:2 to 1:4, the surface was modified to a super-hydrophobic surface having a contact angle hysteresis less than 10° and a contact angle of 150° or greater.

(Evaluation of Coating Layer Durability)

The durability of the substrate on which the PDMS coating was formed was evaluated.

This was carried out based on a recognition that, when the PDMS coating is not strongly bonded to the substrate surface, the coating layer may be dissolved by a PDMS solvent such as hexane or acetone. In addition, the coating layer may be damaged even in a harsh environment irradiated with ultraviolet rays, so this was evaluated.

Figure 8:
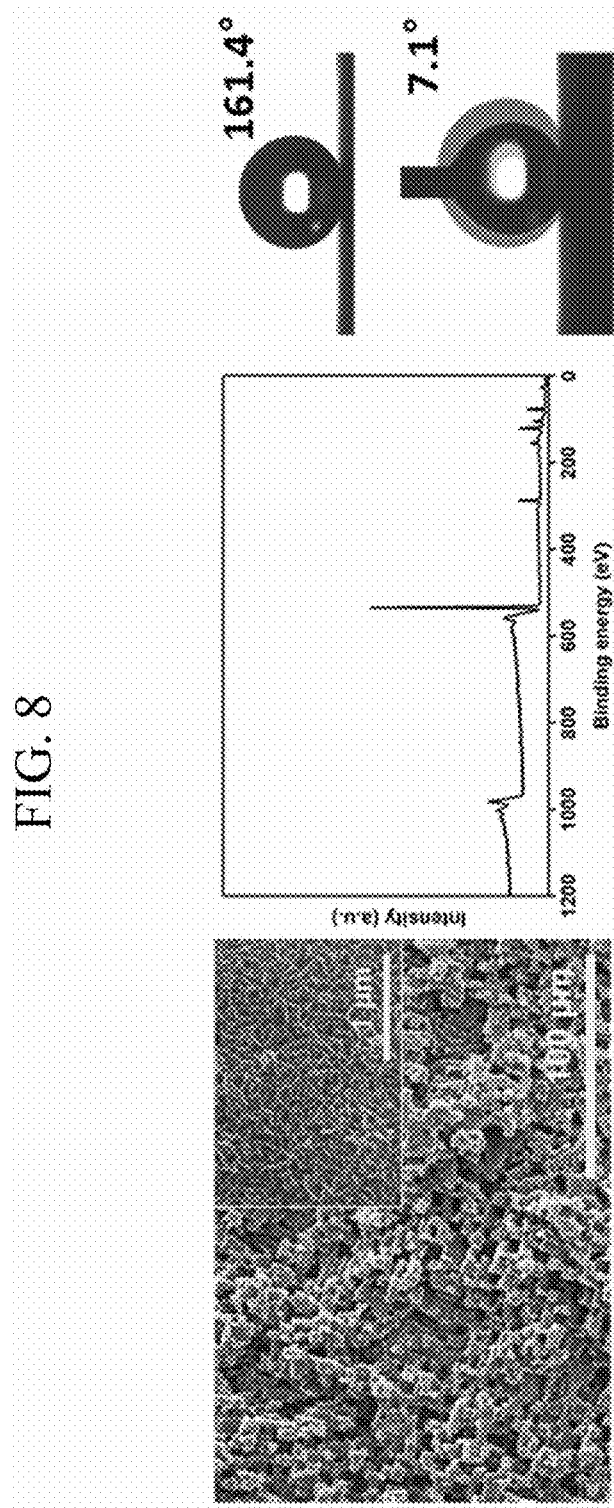
FIGS. 8 to 10 illustrate the results of evaluating the durability of a coating layer formed according to an exemplary embodiment of the present invention, illustrating durability evaluation according to hexane dipping (FIG. 8), acetone dipping (FIG. 9), and ultraviolet irradiation (FIG. 10).
Figure 9:
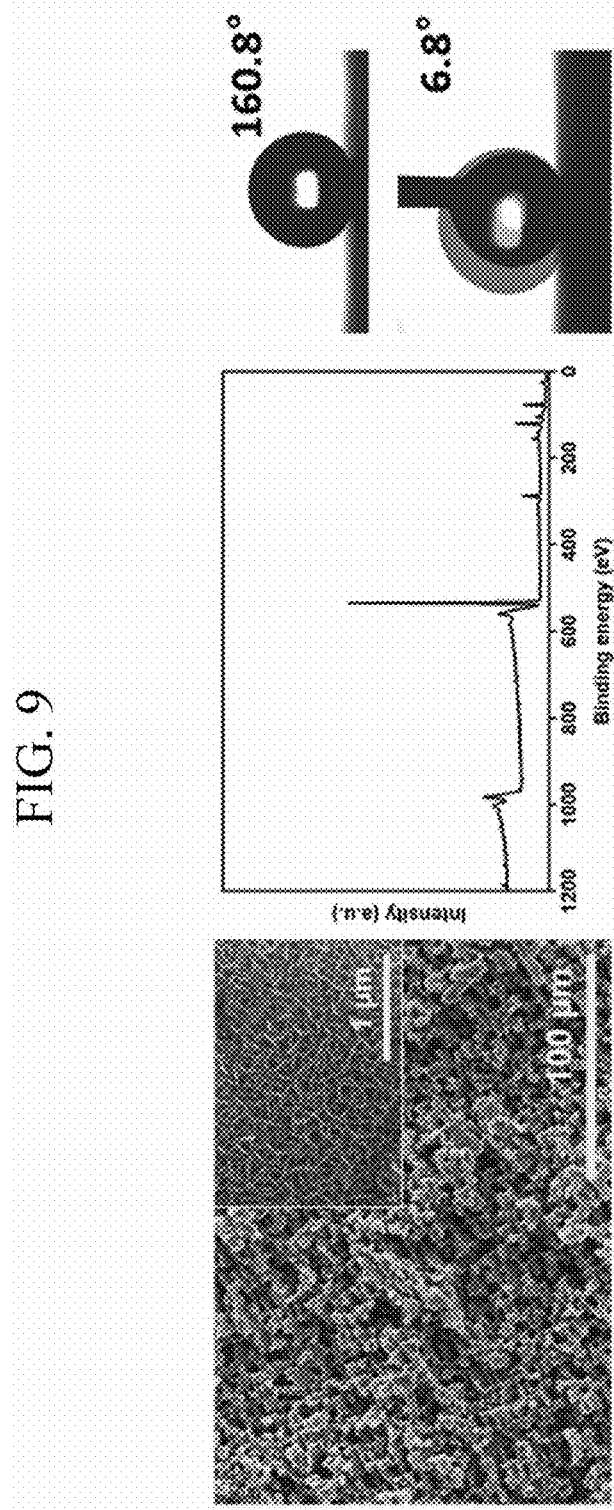
Figure 10:
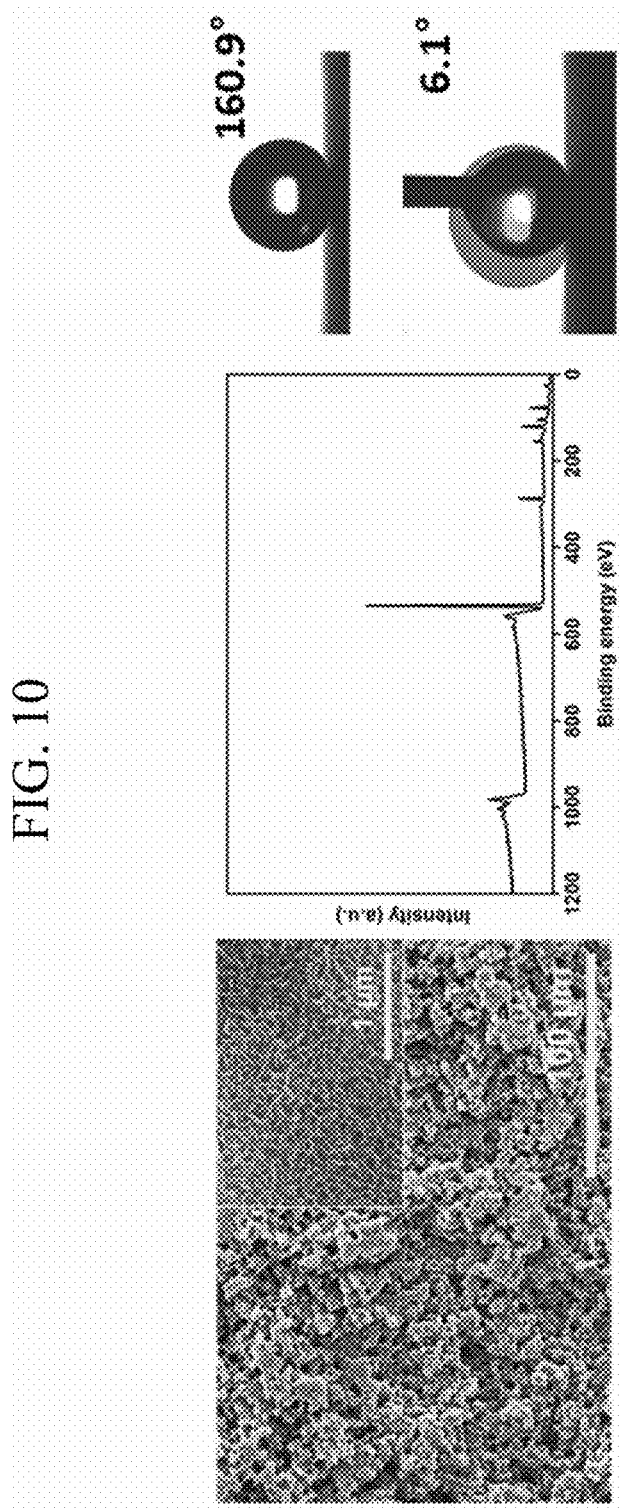

The substrate on which the PDMS coating was formed was dipped in hexane for 5 days (FIG. 8), dipped in acetone for 5 days (FIG. 9), and irradiated with UV rays for 5 days (FIG. 10), and then, a shape in the surface and a change in a contact angle were checked.

The ultraviolet irradiation experiment was performed by irradiating the substrate having a surface on which the PDMS coating was formed with UV rays using an ultraviolet lamp (wavelength 365 nm) at a height of 20 cm away from the substrate for 5 days.

As a result of a robustness test, it was confirmed that the super-hydrophobicity was maintained with all contact angles of 150° or greater and contact angle hysteresis less than 10° without any change in surface structure and chemical composition even after 5 days of testing. It was found that the hydrophobic coating layer formed a strong bond with the substrate surface (refer to FIGS. 8 to 10).

(Application of PDMS Coating)

Figure 11:
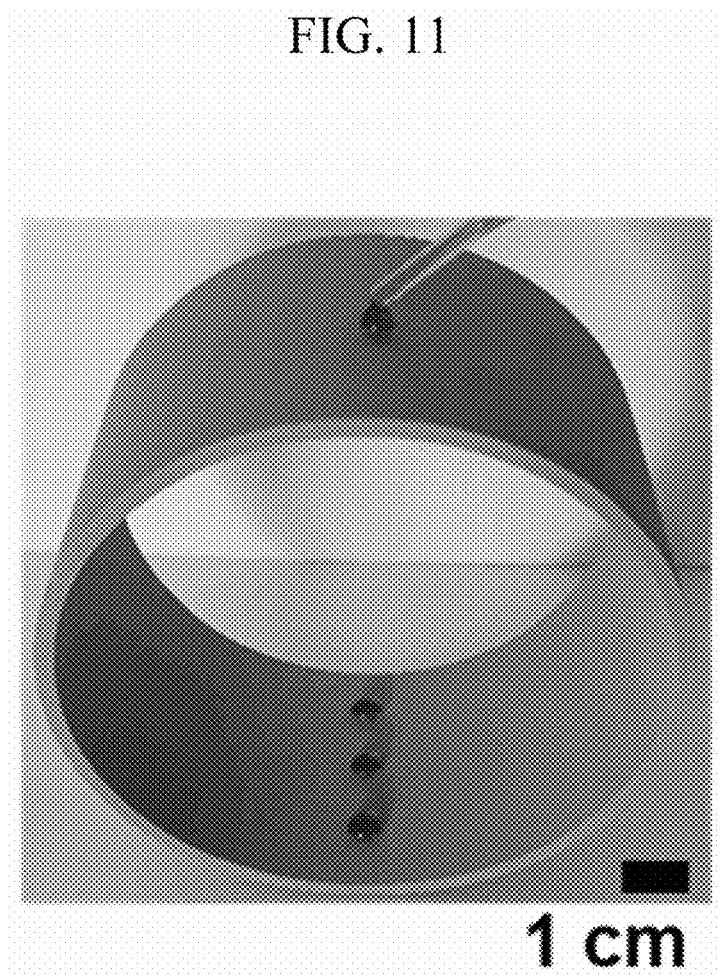
FIGS. 11 and 12 illustrate a three-dimensional (3D)-shaped pipe inner and outer coating (FIG. 11) and a heat exchanger surface coating (FIG. 12) formed according to an exemplary embodiment of the present invention.
Figure 12:
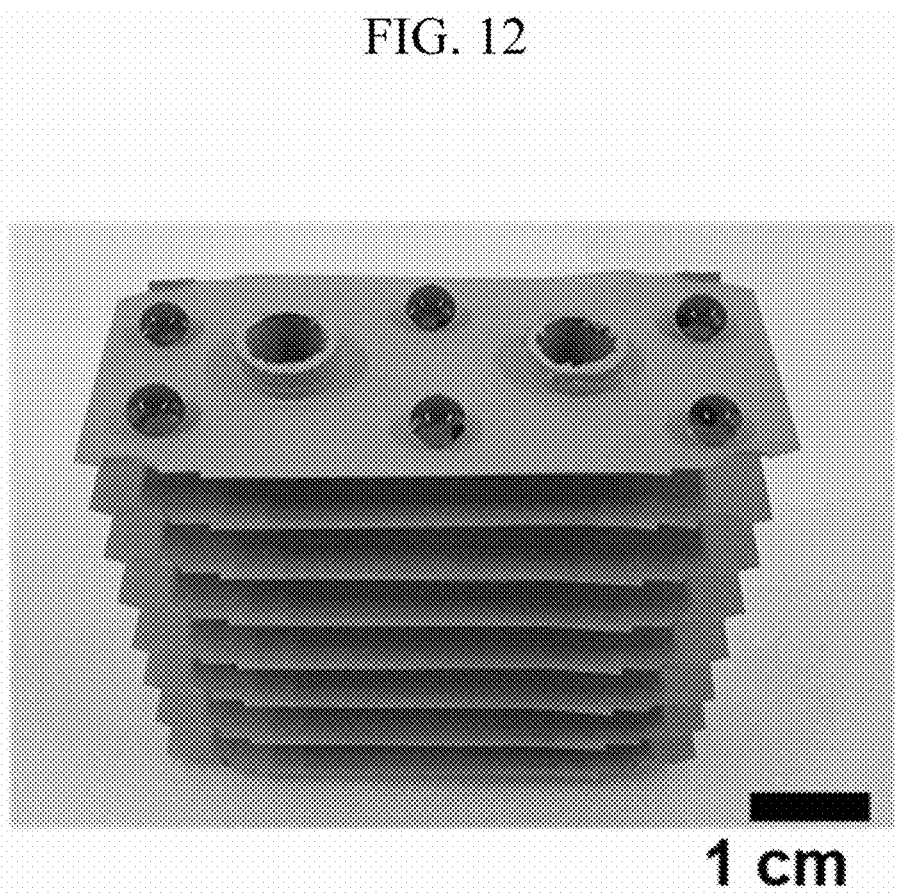
Figure 13:
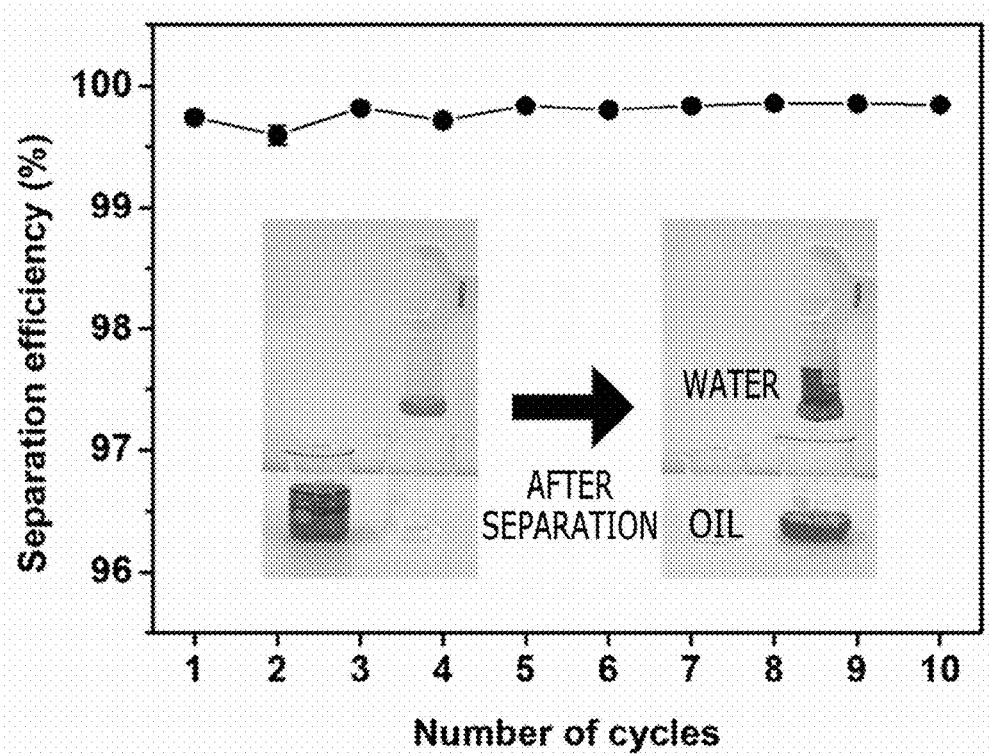
FIG. 13 is a view illustrating the results of coating a metal mesh by a coating method of an exemplary embodiment of the present invention and performing oil-water separation.

It was confirmed that a coating method may be applied to substrates of various shapes by the method of forming the PDMS coating of the exemplary embodiment of the present invention (refer to FIGS. 11 to 13). In addition, it was confirmed that the coating method may be applied to various metal materials (refer to FIGS. 14 and 15).

Super-hydrophobicity can be implemented on the inner/outer surface of the 3D pipe (FIG. 11), and super-hydrophobicity can be implemented even on a surface of a heat exchanger having a complex structure (FIG. 12).

In addition, oil-water separation was performed by manufacturing a filter for oil-water separation by applying the PDMS coating method of the exemplary embodiment of the present invention to a metal mesh (FIG. 13).

The surface roughness of the metal mesh was obtained through the same process as the surface roughness forming process of the aluminum substrate, and the super-hydrophobic metal mesh was manufactured through the super-hydrophobic coating method according to the present invention.

Since the manufactured super-hydrophobic metal mesh does not wet with water and has selective wetting properties that easily wet with oil, it is possible to selectively recover only oil from a mixture of water and oil. Using the properties, water and oil were separated, and separation efficiency was calculated. Specifically, this oil-water separation test was performed by mixing 20 g of de-ionized water and 20 g of 1,2-dichloroethane, and the oil-water separation efficiency was calculated by measuring the moisture content in the oil (dichloroethane) recovered after the oil-water separation test.

In a first oil-water separation test, the separation efficiency was 99.7%, and a super-hydrophobic filter manufactured with a separation efficiency of 99.8% had very high separation efficiency and may be reused at the same time. That is, the super-hydrophobic filter may be reused for oil-water separation by removing surface residues by washing in hexane for 10 seconds after separation, and it was confirmed that a high separation efficiency was maintained even when reused for 10 times.

Figure 14:
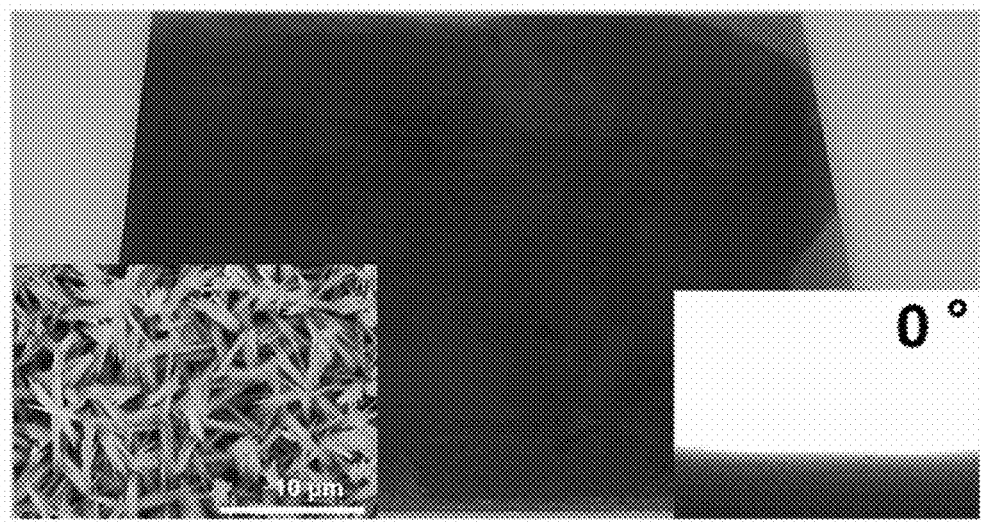
FIGS. 14 and 15 illustrate a comparison between before (FIG. 14) and after (FIG. 15) applying a coating method of an exemplary embodiment of the present invention to a copper surface on which a nanostructure is formed.
Figure 15:
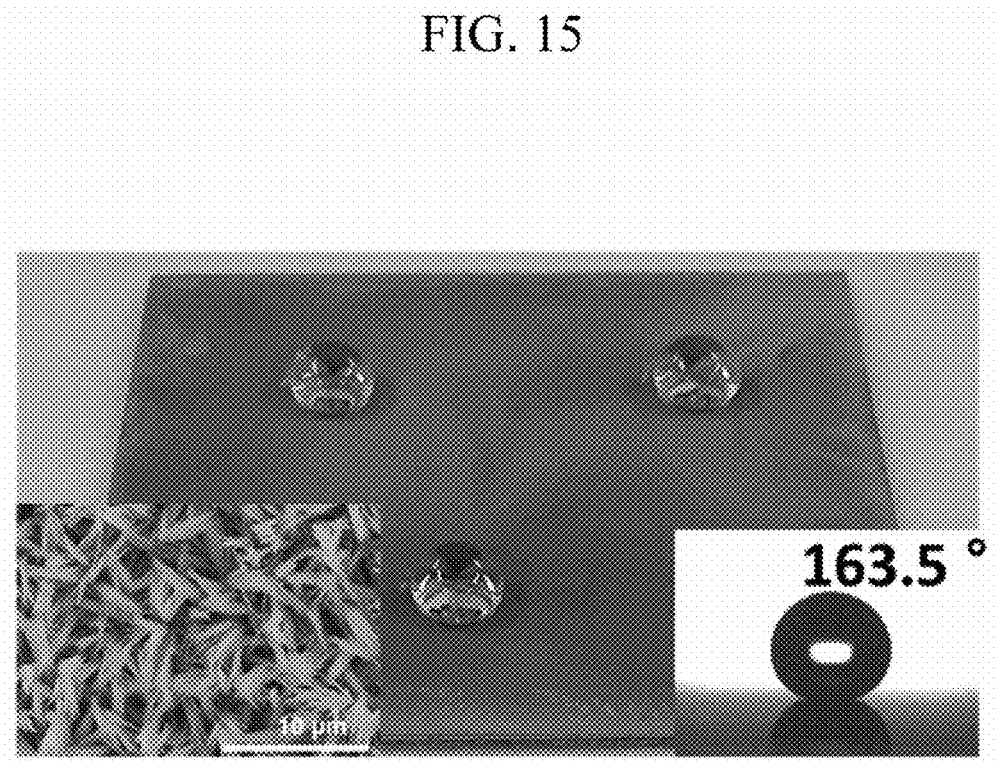

In addition, the contact angles before and after coating were compared by performing super-hydrophobic coating on the copper surface by the PDMS coating method of the exemplary embodiment of the present invention (FIGS. 14 and 15). It was confirmed that, the copper surface before coating had a nanostructure, so it was extremely hydrophilic with a contact angle of 0° (FIG. 14), and after coating, super-hydrophobicity was formed with a contact angle of 163.5° (FIG. 15). Through the coating on the copper surface, it was confirmed that the PDMS coating method may be applied to various metals as well as aluminum.

The present invention is not limited to the exemplary embodiments, but may be manufactured in a variety of different forms, and a person skilled in the art to which the present invention pertains may understand that the present invention may be implemented in other specific forms, without changing the technical idea or essential features of the present invention. Therefore, it should be understood that the exemplary embodiments described above are exemplary in all respects and not restrictive.

The invention claimed is:

1. A surface modification method comprising:
preparing a metal substrate on which surface roughness is formed;
preparing a coating solution in which a polydimethylsiloxane (PDMS) agent and ammonium bicarbonate are mixed; and
coating the surface of the metal substrate on which the surface roughness is formed with PDMS by increasing a temperature of the coating solution,
wherein the preparing the metal substrate on which the surface roughness is formed comprises forming the surface roughness on the metal substrate, and
the coating of the surface of the substrate on which the surface roughness is formed with PDMS by increasing the temperature of the coating solution includes increasing the temperature after the substrate on which the surface roughness is formed and the coating solution are loaded in an airtight container.

2. The surface modification method of claim 1, wherein:
in the coating of the surface of the substrate on which the surface roughness is formed with PDMS by increasing the temperature of the coating solution,
the increased temperature is 70 to 120° C.

3. The surface modification method of claim 1, wherein:
the coating of the surface of the substrate on which the surface roughness is formed with PDMS by increasing the temperature of the coating solution
is performed for more than 15 minutes to less than 90 minutes,
so that the surface of the substrate is modified to have a hydrophobic surface having a contact angle of 90° or greater and a contact angle hysteresis of 10° or greater.

4. The surface modification method of claim 1, wherein:
the coating the surface of the substrate on which the surface roughness is formed with PDMS by increasing the temperature of the coating solution
is performed for 90 minutes or more,
so that the surface of the substrate is modified to have a super-hydrophobic surface having a contact angle of 150° or greater and a contact angle hysteresis less than 10°.

5. The surface modification method of claim 1, wherein:
the surface modification method uses the coating solution in which the PDMS agent and ammonium bicarbonate are mixed in a weight ratio of less than 1:2, so that the surface of the substrate is modified to have a contact angle of 90° or greater and a contact angle hysteresis of 10° or greater.

6. The surface modification method of claim 1, wherein:
the surface modification method uses the coating solution in which the PDMS agent and ammonium bicarbonate are mixed in a weight ratio of 1:2 or greater, so that the surface of the substrate is modified to have a contact angle of 150° or greater and a contact angle hysteresis less than 10°.

7. The surface modification method of claim 1, wherein:
the metal substrate on which the surface roughness is formed is aluminum, copper, or a combination thereof.

8. The surface modification method of claim 1, wherein:
the metal substrate on which the surface roughness is formed is a metal mesh or a three-dimensional (3D) object.

9. The surface modification method of claim 1, wherein:
the substrate on which the surface roughness is formed has a micro-scale microstructure or a nano-scale structure formed on the surface.

10. The surface modification method of claim 1, wherein:
the preparing of the metal substrate on which the surface roughness is formed includes
forming a micro-scale microstructure by dipping the metal substrate in an acid solution having a concentration of 1 to 5M at room temperature for 5 to 15 minutes.

11. The surface modification method of claim 10, further comprising:
heating and drying the substrate on which the microstructure is formed,
after the forming of the micro-scale microstructure.

12. The surface modification method of claim 1, wherein:
the preparing of the metal substrate on which the surface roughness is formed includes
forming a nano-scale structure by dipping the metal substrate in a basic solution having a concentration of 0.5 to 3M at room temperature for 1 to 10 seconds and then dipping the metal substrate in water at a temperature of 80 to 100° C. for 1 to 10 minutes.

13. The surface modification method of claim 12, further comprising:
heating and drying the substrate on which the nano-scale structure is formed,
after the forming of the nano-scale structure.

14. The surface modification method of claim 1, wherein:
the coating the surface of the substrate on which the surface roughness is formed with PDMS by increasing the temperature of the coating solution includes
modifying the surface by decomposing and vaporizing the ammonium bicarbonate and reacting PDMS molecules with a functional group on the surface of the substrate.

15. The surface modification method of claim 1, wherein:
the PDMS agent has a ratio of a main agent and a curing agent of 20:1 to 1:1.

* * * * *